United States Patent [19]
Iida

[11] 3,945,719
[45] Mar. 23, 1976

[54] MOTION PICTURE CAMERA
[75] Inventor: Yozo Iida, Komae, Japan
[73] Assignee: Nippon Kogaku K.K., Tokyo, Japan
[22] Filed: Feb. 21, 1975
[21] Appl. No.: 551,670

[30] Foreign Application Priority Data
Feb. 25, 1974 Japan.............................. 49-21401
Feb. 25, 1974 Japan.............................. 49-21402

[52] U.S. Cl.................................. 352/72; 352/91 C
[51] Int. Cl.²........................................ G03B 23/02
[58] Field of Search.......... 352/72, 91 R, 91 S, 91 C

[56] References Cited
UNITED STATES PATENTS
3,860,195  1/1975  Holzhauser............................ 352/72

*Primary Examiner*—Monroe H. Hayes
*Attorney, Agent, or Firm*—Shapiro & Shapiro

[57] ABSTRACT

In a motion picture camera which permits selective use of a magazine A of the type having an unreleasable reverse-preventing means provided on a take-up shaft for taking up thereon exposed film and a magazine B of the type having an extraneously releasable reverse-preventing means provided on a take-up shaft and which has a take-up gear rotatable in response to a motor and a member secured to the gear for rotating the take-up shaft with rotation of the gear, there is provided detector means displaceable to a first position upon insertion of the magazine A and to a second position upon insertion of the magazine B to identify the magazine inserted. The take-up gear is integrally formed with the detector means for displacement in the axial direction thereof. There is also provided control means manually operable for displacement from a first position for permitting rotation of the takepup gear to a second position for disabling the take-up gear from rotating when the detector means is in its first position, and means for releasing the reverse-preventing means of the magazine B when the magazine B is inserted.

14 Claims, 10 Drawing Figures

MOTION PICTURE CAMERA

BACKGROUND OF THE INVENTION

1. Field of the Invention

This invention relates to a motion picture camera which permits two different types of film magazine to be selectively used.

2. Description of the Prior Art

Film magazines commonly available for use with motion picture cameras are each provided with a reverse-preventing means in the winder core on the take-up side for preventing slack of the film within the magazine. The use of such magazine (hereinafter referred to as "magazine A") to effect rewind of the film has already been proposed in Japanese Patent Publication No. 15467/1970. On the other hand, a motion picture camera using a magazine provided with a similar reverse-preventing means which is movable to inoperative position upon depression of a portion of the take-up shaft to permit normal and reverse rotations (hereinafter referred to as "magazine B") has been proposed in U.S. Pat. No. 3,599,894 and Japanese Patent Publication No. 35238/1971 (U.S. Pat. NO. 3,623,679).

In the former type of magazine, when film is to be rewound for multiplex photography (namely, during rewind), a preparatory operation is first effected, and the photography is made. By this preparatory operation, actual film rewind for predetermined amount is made possible.

In the latter type of magazine, exposed film may be rewound at any time and for any desired amount without the afore-said preparatory operation being involved.

SUMMARY OF THE INVENTION

It is an object of the present invention to provide motion picture camera which permits the described two types of film magazine to be used.

A feature of the present invention is that there is provided a detector member displaceable depending on the difference in configuration or size between film magazines or depending on whether the reverse-preventing means of the magazine has an inoperative position, and release means for rendering the reverse-preventing means inoperative, so that when magazine A whose reverse-preventing means cannot be rendered inoperative is inserted, photography can be effective during rewind with the take-up shaft of the magazine A drivingly disconnected and, when magazine B whose reverse-preventing means can be rendered inoperative is inserted, photography can be effective with the take-up shaft of the magazine B drivingly connected.

Other objects and features of the present invention will become fully apparent from the following detailed description taken in conjunction with the accompanying drawings.

DESCRIPTION OF THE PREFERRED EMBODIMENTS

Figure 1:
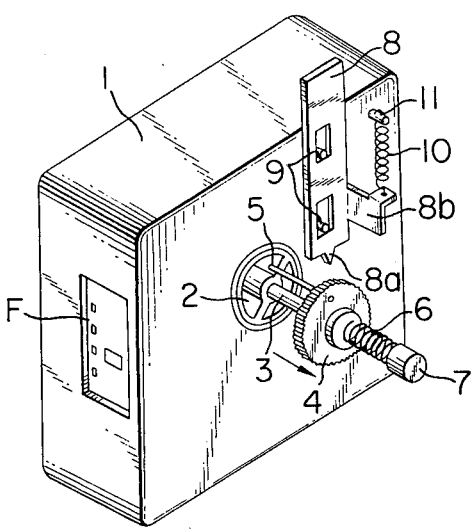
FIGS. 1 to 3 are perspective views of a first embodiment of the present invention, FIGS. 1 and 2 showing the case where magazine A is inserted but FIG. 1 referring to normal photography and FIG. 2 referring to rewind, and FIG. 3 showing the case where magazine B is inserted and referring to rewind.
Figure 2:
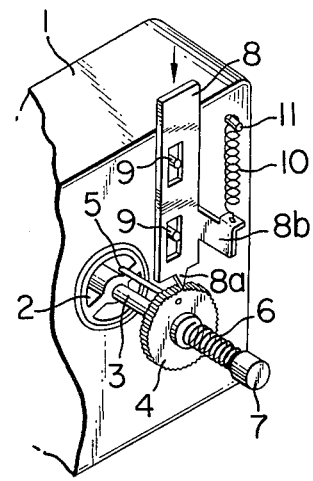
Figure 3:
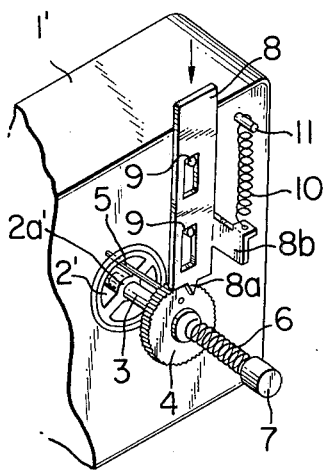

A first embodiment of the present invention will hereinafter be described with reference to the drawings. FIGS. 1 to 3 are perspective views of the first embodiment, FIGS. 1 and 2 showing the case where magazine A is inserted and FIG. 3 showing the case where magazine B is inserted. The interior of magazine A, designated by reference numeral 1, is divided into two chambers, i.e. supply chamber and take-up chamber. The magazine A has its core 2 integrally formed with a take-up shaft and winder core (not shown), as is well-known. Designated by letter F is film. In the present embodiment, a detector member 3 serves also as release means for rendering the reverse-preventing means of magazine B inoperative, and has one end engaged with the core 2 of the film magazine and the other end formed with a take-up gear 4 for transmitting the drive of a motor (not shown). The take-up gear 4 is engaged by unshown friction spring or the like so as to absorb or alleviate the load variation of the film take-up shaft resulting from intermittent transport of the film and thereby permit smooth take-up of the film without imparting any compulsion to the film.

A take-up pin 5 secured to the take-up gear 4 is engaged with the core 2 to transmit the rotation of the motor to the take-up shaft and winder core within the film magazine.

A biasing spring 6 is supported by a step 7, which is integral with the main body of the motion picture camera, to bias the detector member 3 and the take-up gear 4 toward the film magazine. The position of the detector member 3 prior to the insertion of the magazine is defined as a second position. A control member 8, connected to a rewind button (not shown) which is extraneously operable during rewind, has an engaging portion 8a for engagement with the take-up gear 4 and is vertically movable with the aid of guide pins 9. A biasing spring 10 for upwardly biasing the control member 8 is secured to a spring-hooking pin 11. The guide pins 9 and spring-hooking pin 11 are secured to the main body of the motion picture camera. Magazine B, designated by 1', has its core 2' integrally formed with the take-up shaft and winder core, but a portion 2a' thereof opposed to the detector member 3 is formed as a hollow in which a portion of the reverse-preventing means (not shown) is inserted.

By forcing the reverse-preventing means in the hollow into the film magazine, the device may be rendered inoperative.

Operation of the first embodiment will now be described with respect to magazines A and B, respectively.

1. Case where magazine A is inserted (FIGS. 1 and 2):

When the magazine A is inserted, the detector member 3 is moved in the direction of arrow by a projection in the center of the core 2 to position the take-up gear 4 in the same plane as that of the control member 8. (This position is defined as a first position of the detector member 3). Such position is shown in FIG. 1. Normal rotation photography may occur under such conditions.

To rewind the film F, the rewind button (not shown) is first depressed. In response to the depression of the rewind button, the control member 8 is depressed in the direction of arrow to bring the engaging portion 8a into meshing engagement with the take-up gear 4 and is secured in such position. (This position is defined as a second position of the control member 8). Such position is shown in FIG. 2. Thus, the take-up shaft effects no rotation and the film F is transported into the take-up side for a predetermined amount by an unshown film transport claw. Subsequently, a motor change-over switch (not shown) is shifted to the position for reverse rotation, to thereby effect film rewind. Said predetermined amount of the film is thus rewound by the claw.

Next, the change-over switch is shifted to the position for normal rotation and the rewind button is returned to its initial position to thereby disengage the engaging portion 8a of the control member 8 from the take-up gear 4. That is, the control member 8 is retracted from the take-up gear 4 by the force of the spring 10.

The retracted position of the control member 8 is defined as a first position thereof.

Thereafter, by effecting normal rotation photography, various techniques of photography such as multiplex photography, overlap photography, etc. may be accomplished for the predetermined amount of the film.

II. Case where magazine B is inserted (FIG. 3):

When magazine B is inserted, the plugging device is forced into magazine B by the detector and release member 3 biased by the spring 6, so that the plugging device releases its reverse-preventing action. At this time, the take-up gear 4 and the control member 8 are not in the same plane, unlike their relative positions prior to the insertion of the magazine.

To rewind the film F, the rewind button is depressed. Thereby the control member 8 is depressed to its second position in the direction of arrow, but the take-up gear 4 remains rotatable since the control member is not in the same plane as the gear 4. After the rewind button has been depressed, the control member may be secured in the position where the rewind button and control member 8 have been depressed, as in the case (I), or alternatively the control member may be returned by the spring 10. Thus, by shifting the motor change-over switch (not shown) to the position reverse rotation, the drive of the motor is transmitted to the take-up gear 4 to cause the take-up pin 5 to rotate the core 2 in reverse direction, so that the film F is transported from the take-up side directly to the supply side. Next, to effect normal rotation photography, the change-over switch may be shifted to the position for normal rotation. (The rewind button must be returned if the control member is secured.)

Figure 4:
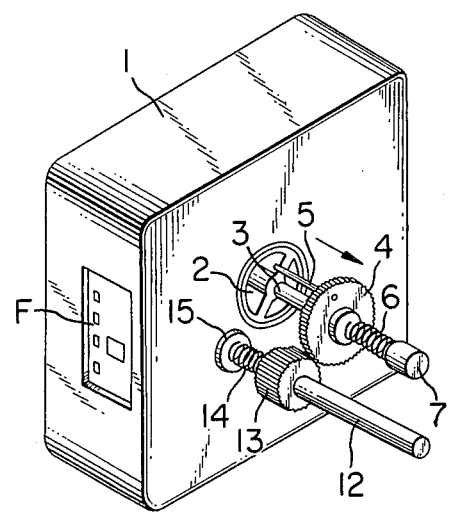
FIGS. 4 to 6 are perspective views of a second embodiment of the present invention, FIGS. 4 and 5 showing the case where magazine A is inserted but FIG. 4 referring to normal photography and FIG. 5 referring to rewind, and FIG. 6 showing the case where magazine B is inserted and referring to rewind.
Figure 5:
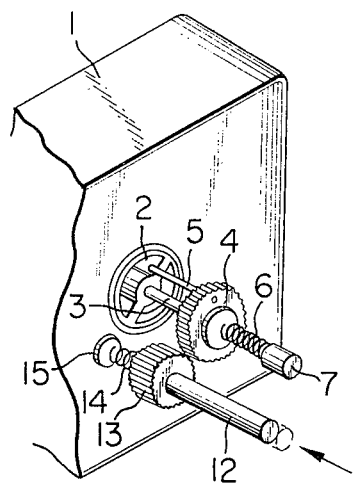
Figure 6:
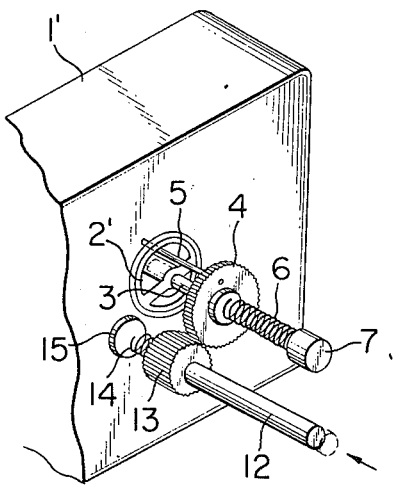

A second embodiment of the present invention will now be described with reference to FIGS. 4 to 6. FIGS. 4 and 5 show the case where magazine A is inserted, and FIG. 6 shows the case where magazine B is inserted. In these figures, reference characters similar to those in FIGS. 1 to 3 designate similar elements. Control member 12, connected to rewind button (not shown) which is extraneously operable during rewind, has as its one end rotatably supporting intermediate gear 13 engageable with take-up gear 4 on detector member 3. The intermediate gear 13 meshes with transmission gear (not shown) on the motor side to transmit the drive of the motor through the take-up gear 4 to the take-up shaft of the magazine. Biasing spring 14 is provided to bias the control member 12 rightwardly, and it is supported by step 15 forming a part of the main body of the motion picture camera.

Case where magazine A1 is inserted (FIGS. 4 and 5):

The detector member 3 assumes its first position as in the case of the first embodiment. The connecting gear 13 of the control member 12, near the right end thereof, is in meshing engagement with the take-up gear 4 of the detector member 3. This position is shown in FIG. 4. Normal rotation photgraphy is performed in this position.

To rewind the film F, the rewind button is depressed as in the first embodiment. In response to the depression of the rewind button, the control member 12 is forced in the direction of arrow to disengage the connecting gear 13 from the take-up gear 4. This position is defined as the second position of the control member as in the case of the first embodiment. Thus, the drive from the motor is not transmitted to the magazine. This position is shown in FIG. 5. That is, with the rewind button forced in, the intermediate gear 13 is out of meshing engagement with the take-up gear 4, so that the take-up shaft in the magazine is not rotated and film transport may be effected in both of normal and reverse directions, by the film transport claw.

Case where magazine B1' is inserted (FIG. 6):

The detector member 3 assumes its second position as in the case of the first embodiment. The connecting gear 13 of the control member 12, near the right end thereof, is in meshing engagement with the take-up gear 4 on the detector member 3. Normal rotation photography occurs in this position.

To rewind the film, the rewind button is depressed as in the first embodiment or as in the previous case of the present embodiment. In response to the depression of the rewind button, the control member 12 is forced in the direction of arrow so that the intermediate gear 13, in the intermediate portion or near the right end thereof, meshes with the take-up gear 4. Thus, the drive of the motor is transmitted to the take-up shaft in the magazine 1' to effect the rewind of the film.

Figure 7:
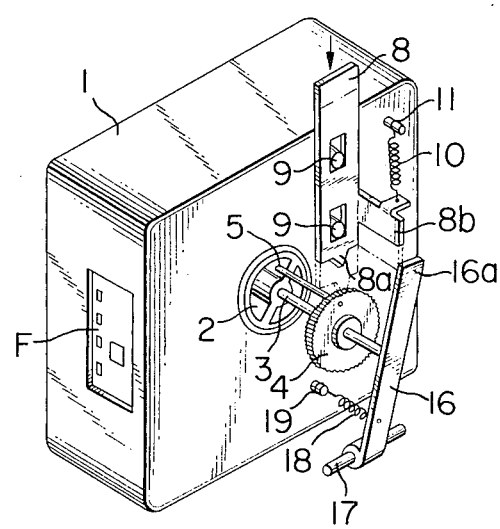
FIGS. 7 and 8 are perspective views of a third embodiment of the present invention, FIG. 7 showing the case where magazine A is inserted and FIG. 8 showing the case where magazine B is inserted.
Figure 8:
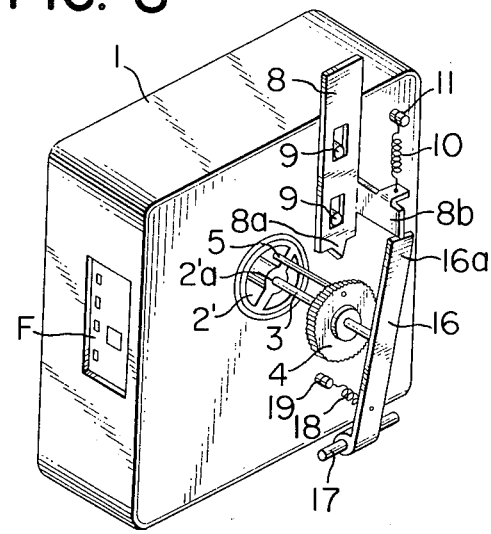

A third embodiment of the present invention will now be described with reference to FIGS. 7 and 8. FIG. 7 shows the case where magazine A is loaded, and FIG. 8 shows the case where magazine B is loaded. In these figures, reference characters similar to those in FIGS. 1 to 6 designate similar elements. In FIGS. 7 and 8, blocking member 16 is biased toward the film magazine with shaft 17 as the pivot, by spring 18, the shaft 17 being secured to the main body of the motion picture camera (not shown).

Spring-hooking pin 19 for spring 18 is secured to the main body. Detector member 3, serves also as a release member for rendering the reverse-preventing means of the magazine B inoperative, and has one end engaged by the blocking member 16 and is biased toward the film magazine by the spring 18.

Control member 8, connected to rewind button (not shown) which is extraneously operable during rewind, has a first engaging portion 8b for engagement with the free end 16a of the blocking member 16 and a second engaging portion 8a for engagement with take-up gear 4, and is vertically movable with the aid of guide pins 9. The control member 8 is biased upwardly by biasing spring 10. The spring-hooking pin 11 of the biasing spring 10 and the guide pins 9 are all secured to the main body of the motion picture camera.

Operation of the third embodiment will hereinafter be explained with respect to magazines A and B, respectively.

I. Case where magazine A is inserted (FIG. 7):

Solid lines indicate the position for normal photography (normal rotation photography), and dots-and-dash lines indicate the position for rewind.

The detector member 3 is forced in the direction of arrow by a projection in the center of core 2 on which magazine A is placed. Thereby, the blocking member 16 is rotated clockwise about the shaft 17 against the force of the spring 18, so that the end 16a of the blocking member is retracted from the path of displacement of the first engaging portion 8b of the control member 8. In this position, normal rotation photography occurs.

Rewind will now be explained in detail. Rewind button (not shown) is first depressed. Since the end 16a of the blocking member 16 has been retracted from the path of displacement of the first engaging portion 8b of the control member 8, this control member is depressed in the direction of arrow to bring the second engaging portion 8a thereof into meshing engagement with the take-up gear 4 and is secured in this position. Thus, the take-up gear 4 is not rotated and a predetermined amount of film F is transported to the take-up side by unshown transport claw. Subsequently, the motor change-over switch (not shown) is shifted to the position for reverse rotation to effect rewind of the film. Said predetermined amount of the film transported to the take-up side is now rewound back to the supply side by the calw.

Next, the change-over switch is shifted to the position for normal rotation and the rewind button is returned to its initial position to disengage the second engaging portion 8a of the control member from the take-up gear 4. That is, the control member 8 is retracted from the take-up gear 4 by the force of the spring 10.

Thereafter, by effecting normal rotation photography (normal photography), various techniques of photography such as multiplex photography, overlap photography, etc. may be accomplished for said predetermined amount of the film.

II. Case where magazine B is inserted (FIG. 8):

When magazine B is inserted, the reverse-preventing device is forced into the magazine by the detector and release member 3 to release the reverse-preventing device from its operative position. Thus, the end 16a of the blocking member 16 comes into the path of displacement of the first engaging portion 8b of the control member 8, and becomes engageable with the first engaging portion. To rewind the film F, the rewind button is depressed.

However, the control member 8 is prevented from moving by the engagement between the end 16a and the first engaging portion 8b and therefore, the rewind button cannot be depressed. Of course, such operation is not necessary when the use of magazine B has already been confirmed.

In other words, the rewind button has a function of discriminating between the types of magazine in use. Now, the motor change-over switch is shifted to the position for reverse rotation to effect rewind of the film. To drive of the motor is transmitted to the take-up gear 4 to cause the take-up pin 5 to rotate the core 2, so that the film F is transported from the take-up side directly to the supply side.

To effect normal rotation photography, the motor change-over switch may be shifted to the position for normal rotation.

Commercially available magazines A and B are somewhat different in size, and magazine B in which the reverse-preventing means rendered inoperative upon insertion of the magazine is larger than magazine A. A fourth embodiment of the present invention (FIG. 9), which will hereinafter be described, utilizes the size difference to detect the type A or B of the magazine inserted. The fourth embodiment will now be discussed with reference to FIG. 9, in which reference characters similar to those in FIGS. 1 to 8 designate similar elements.

Figure 9:
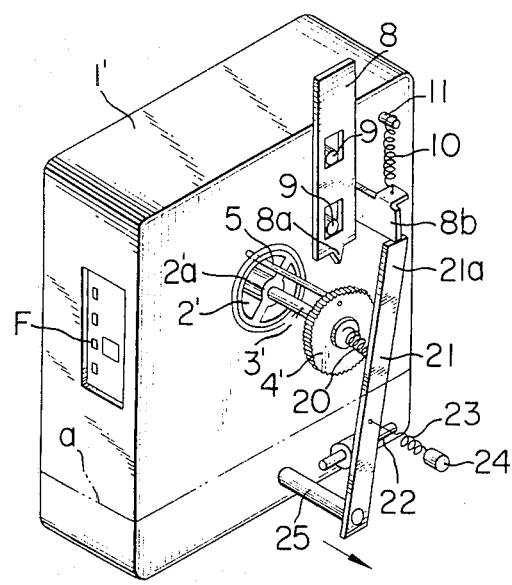
FIG. 9 is a perspective view of a fourth embodiment of the present invention and showing the case where magazine B is inserted.

FIG. 9 shows the case where magazine B is inserted, and dots-and-dash line therein indicates the size of magazine A. Blocking member 21 is biased for rotation about shaft 22 in the direction opposite to that of blocking member 16 in the third embodiment (i.e. clockwise direction), by spring 23. Spring-hooking pin 24 for the spring 23 is secured to the main body of the motion picture camera. Detector member 25 is secured to the blocking member 21. Designated by 3' is release pin for releasing the reverse-preventing means from its reverse-preventing operation, and designated by 4' is take-up gear secured to the release pin 3'. Coil spring 20 has one end which is supported by the main body of the motion picture camera (not shown), and biases the release pin 3' and take-up gear 4' toward the film magazine.

I. Case where magazine A is inserted:

Since magazine A is not engageable with the detector member 25, the blocking member 21 is rotated clockwise to make the end 21a thereof unengageable with the first engaging portion 8b of control member 8. The release pin 3' is moved toward this side in the drawing by the control projection of core 2' to bring take-up gear 10' to the same plane as the control member 8.

Rewinding operation is entirely the same as that in the third embodiment.

II. Case where magazine B is inserted (FIG. 9):

The lower portion of magazine B forces the detector member 25 in the direction of arrow, so that the blocking member 21 is rotated counter-clockwise to make one end 21a thereof engageable with the first engaging portion 8b, of the control member. The release pin 3' forces the reverse-preventing means into the magazine with the aid of the force of coil spring 20, thereby releasing the reverse-preventing operation.

The rewinding operation is entirely the same as that in the third embodiment.

In the first, second and third embodiments, the detector member 3 serves also as the release member which is functionally similar to the release pin 3' in the fourth embodiment, whereas in the fourth embodiment the detector member 25 is made integral with the blocking member 21 to serve another purpose, as well.

A fifth embodiment of the present invention will now be described with reference to FIG. 10, in which reference characters similar to those in FIGS. 1 to 9 designate similar elements. Blocking member 26 is biased for counter-clockwise rotation about shaft 27 by spring 28 and has an engaging portion 26a for blocking rotation of control member 30 which will hereinafter be described. Designated by 29 is a spring-hooking pin for the spring 28, and control member 30 is biased clockwise about shaft 31 by spring 32 hooked on spring-hooking pin 33. Designated by 34 is a limit pin for the control member 30. The shafts 27, 31 and the pins 33, 34 are all secured to the main body of the motion picture camera. Intermediate gear 35 is rotatably supported on the control member 30 at one end thereof and makes operative connection and disconnection between unshown transmission gear on the motor side and the take-up gear 4.

I. Case where magazine A is inserted (FIG. 10):

Just as in the third embodiment, the detector member 3 forces one end 26b of the blocking member 26 in the direction of arrow, so that the engaging portion 26a of the blocking member is retracted from the path of rotation of the control member 30. (Dots-and-dash line indicates the position of the blocking member prior to insertion of magazine A.)

Figure 10:
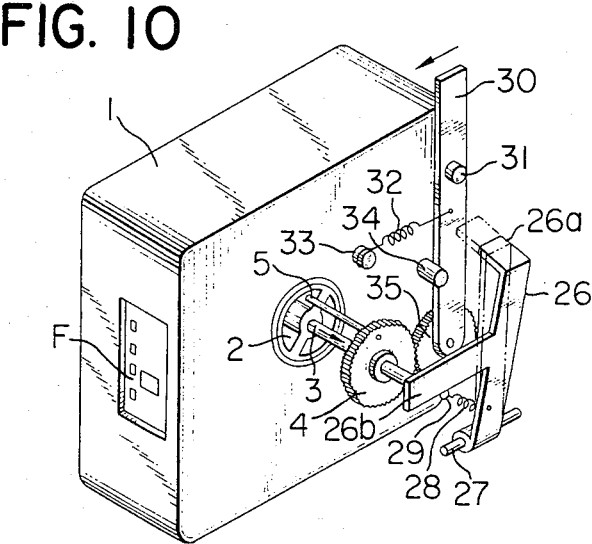
FIG. 10 is a perspective view of a fifth embodiment of the present invention and showing the case where magazine A is inserted.

During normal rotation photography (normal photography, intermediate gear 35 is in meshing engagement with the take-up gear 4 as shown in FIG. 10, so that rotation of the motor is being transmitted to the winder core of the take-up shaft of the magazine A. To rewind the film F, rewind button (not shown) is depressed as described in connection with the previous embodiments. This depression of the rewind button causes the control member 30 to be rotated in the direction of arrow against the force of the spring 32, so that the intermediate gear 35 is retracted from the take-up gear 4. As a result, rotation of the motor is not transmitted to the magazine. That is, with the rewind button in depressed condition, the take-up shaft of the magazine makes no rotation and film transport in both of normal and reverse direction is effected only by the transport claw.

II. Case where magazine B is inserted:

As in the third embodiment, insertion of magazine B causes no displacement of any member of the motion picture camera body, except the reverse-preventing device of the magazine B which is alone moved and released from its reverse-preventing operation.

Therefore, efforts to depress the rewind button cannot result in depression thereof because the control member 30 is prevented from rotating by the engaging portion 26a of the blocking member, and film rewind takes place with the intermediate gear 35 remaining in meshing engagement with unshown transmission gear on the motor side and the take-up gear 4.

According to the present invention, as described above, both unreversible magazine A and reversible magazine B can be simply inserted into the main body of a motion picture camera just in the same manner as in the conventional motion picture camera which uses only one type of magazine, and film rewind can be accomplished without destroying the effects peculiar to respective magazines but with their features sufficiently availed of, and thus, multiplex photography and other photographic techniques can be effected far more advantageously with two types of magazine by the use of a single motion picture camera than before.

Further, according to the third, fourth and fifth embodiments of the present invention, the control member can be used as a member operated during rewind (in these embodiments, the rewind button) and therefore, when the control member has been operated, the type of magazine inserted can readily be known from outside because the condition of engagement of the control member with the blocking member differs depending on the type of magazine.

I claim:

1. A motion picture camera which permits selective use of a magazine A of the type having an unreleasable reverse-preventing means provided on a take-up shaft for taking up thereon exposed film and a magazine B of the type having an extraneously releasable reverse-preventing means provided on a take-up shaft and which has a take-up gear rotatable in response to a motor and a member secured to said gear for rotating said take-up shaft with rotation of said gear, said camera comprising:

detector means displaceable to a first position upon insertion of said magazine A and to a second position upon insertion of said magazine B to identify the magazine inserted, said take-up gear being integrally formed with said detector means for displacement in the axial direction thereof;

control means manually operable for displacement from a first position for permitting rotation of said take-up gear to a second position for disabling said take-up gear from rotating when said detector means is in its first position; and means for releasing the reverse-preventing means of said magazine B when said magazine B is inserted.

2. A motion picutre camera according to claim 1, wherein said magazine B is a magazine having a hollow formed in the winding core of the take-up shaft thereof for partly receiving said reverse-preventing means which is releasable when inserted into said magazine, said magazine A is a magazine having no said hollow formed in the winding core of the take-up shaft thereof, said detector means is a pin member integrally formed with said take-up gear and displaceable, when the magazine A is inserted, to its first position while being in engagement with the winding core of said magazine, and when the magazine B is inserted, into said hollow and to its second position, and said release means is said pin member which, when the magazine B is inserted, moves into said hollow to force said reverse-preventing means from said hollow into the interior of the magazine to thereby release said reverse-preventing means.

3. A motion picture camera according to claim 1, wherein said control means comprises:

a control member having an engaging portion engageable with the toothed portion of said take-up gear, said control member being manually operable for displacement between its first position in which said engaging portion is disengaged from said toothed portion and its second position in which said engaging portion, when said detector means is in its first position, engages said toothed portion of said take-up gear to thereby disable said take-up gear from rotating, said control member being normally biased to its first position.

4. A motion picture camera according to claim 1, wherein said control means comprises:

an intermediate gear capable of meshing with said take-up gear to transmit the drive of said motor to said take-up gear; and a shaft rotatably supporting said intermediate gear;

said supporting shaft being manually operable for displacement between a first position in which said intermediate gear engages said take-up gear when said detector means is in any of its first and second positions and a second position in which said intermediate gear, when said detector means is in its first postion, is disengaged from said take-up gear to thereby disable said take-up gear from rotating, said supporting shaft being normally biased to its first position.

5. A motion picture camera which permits selective use of a magazine A of the type having an unreleasable reverse-preventing means provided on a take-up shaft for taking-up thereon exposed film and a magazine B of the type having an extraneously releasable reverse-preventing means provided on a take-up shaft and which has a take-up gear rotatable in response to a motor and a member secured to said gear for rotating said take-up shaft with rotation of said gear, said camera comprising:
   detector means displaceable to a first position upon insertion of said magazine A and to a second position upon insertion of said magazine B to identify the magazine inserted, said take-up gear integrally formed with said detector means for displacement in the axial direction thereof;
   control means manually operable for displacement from a first position for permitting rotation of said take-up gear to a second position for disabling said gear from rotating;
   blocking means responsive to said detector means to be displaced to block the displacement of said control means from its first position to its second position when said detector means is in its second position; and
   means for releasing the reverse-preventing means of said magazine B when the magazine B is inserted.

6. A motion picture camera according to claim 5, wherein said magazine B is a magazine having a hollow formed in the winding core of the take-up shaft thereof for partly receiving said reverse-preventing means which is releasable when inserted into said magazine, said magazine A is a magazine having no said hollow formed in the winding core of the take-up shaft thereof, said detector means is a pin member integrally formed with said take-up gear and displaceable, when the magazine A is inserted, to its first position while being in engagement with the winding core of said magazine, and when the magazine B is inserted, into said hollow and to its second position, and said release means is said pin member which, when the magazine B is inserted, moves into said hollow to force said reverse-preventing means from said hollow into the interior of the magazine to thereby release said reverse-preventing means.

7. A motion picture camera according to claim 5, wherein said control means comprises:
   a control member having a first engaging portion engageable with the toothed portion of said take-up gear, said control member being manually operable for displacement between its first position in which said first engaging portion is disengaged from said toothed portion and its second position in which said first engaging portion, when said detector means is in its first position, engages said toothed portion of said take-up gear to thereby disable said take-up gear from rotating, said control member being normally biased to its first position.

8. A motion picture camera according to claim 7, wherein said control member has a second engaging portion engageable with said blocking means, and said blocking means comprises:
   a blocking member having a blocking portion engageable with said second engaging portion of said control member, said blocking member being responsive to said detector means to be displaced between a position in which said blocking portion, when said detector means is in its second position, engages said second engaging portion of said control member to thereby block displacement of said control member from its first position to its second position and a position in which said blocking position, when said detector member is in its first position, lies outside the path of displacement of said second engaging portion to thereby permit displacement of said control member from its first position to its second position.

9. A motion picture camera according to claim 5, wherein said control means comprises:
   an intermediate gear capable of meshing with said take-up gear to transmit the drive of said motor to said take-up gear; and
   a pivotable member rotatably supporting said intermediate gear and manually operable to pivot from a first position for engaging said intermediate gear with said take-up gear and a second position for disengaging said intermediate gear from said take-up gear, said pivotable member being normally biased to said first position.

10. A motion picture camera according to claim 9, wherein said blocking means comprises:
   a blocking member having a blocking portion engageable with said pivotable member of said control means, said blocking member being responsive to said detector means to be displaced between a position in which said blocking portion, when said detector means is in its second position, lies in the path of pivotal movement of said pivotable member of said control means to block displacement of said pivotable member from its first position to its second position and a position in which said blocking portion lies in said path of pivotal movement to thereby permit displacement of said pivotable member from its first position to its second position.

11. A motion picture camera according to claim 5, wherein said magazine B is a magazine having a hollow formed in the winding core of the take-up shaft thereof for partly receiving said reverse-preventing means which is releasable when inserted into said magazine, said magazine A is a magazine having no said hollow formed in the winding core of the take-up shaft thereof, and said release means comprises a pin member which, when the magazine A is inserted, engages the winding core thereof and which, when the magazine B is inserted, moves into said hollow to force said reverse-preventing means in said hollow into the interior of the magazine, to thereby release said device.

12. A motion picture camera according to claim 11, wherein said detector means comprises:
   a detector member having a detector pin engageable only with the magazine B, said detector pin being adapted, when the magazine B is inserted, to engage said magazine and displaceable to a second position which is different from said position assumed when the magazine A is inserted.

13. A motion picture camera according to claim 12, wherein said control means comprises:
a control member having a first engaging portion engageable with the toothed portion of said take-up gear, said control member being manually operable for displacement between its first position in which said first engaging portion is disengaged from said toothed portion and its second position in which said first engaging portion, when said detector means is in its first position, engages said toothed portion of said take-up gear to thereby disable said take-up gear from rotating, said control member being normally biased to its first position.

14. A motion picture camera according to claim 13, wherein said control member has a second engaging portion engageable with said blocking means, and said blocking means comprises:
a blocking member having a blocking portion engageable with said second engaging portion of said control member, said blocking member being responsive to said detector means to be displaced between a position in which said blocking portion, when said detector means is in its second position, engages said second engaging portion of said control member to thereby block displacement of said control member from its first position to its second position and a position in which said blocking position, when said detector member is in its first position, lies outside the path of displacement of said second engaging portion to thereby permit displacement of said control member from its first position to its second position.

* * * * *